United States Patent Office 3,732,196
Patented May 8, 1973

3,732,196
ANTI-ELECTROSTATIC LIGHT-STABLE POLY-OLEFIN MOULDING COMPOSITIONS
Dieter Dieterich, Leverkusen, and Horst Niermann, Cologne, Germany, assignors to Bayer Aktiengesellschaft, Leverkusen, Germany
No Drawing. Filed Jan. 28, 1971, Ser. No. 110,777
Claims priority, application Germany, Mar. 4, 1970,
P 20 10 118.2
Int. Cl. C08f 29/04
U.S. Cl. 260—93.7                     5 Claims

ABSTRACT OF THE DISCLOSURE

Moulding compositions comprising an olefin polymer and as antistatic agent a salt of an aliphatic carboxylic acid with at least 6 carbon atoms and of a 2-dialkylamino-methyl-2-alkyl-1,3-propane diol.

---

This invention relates to anti-electrostatic, stable moulding compositions based on olefin homopolymers and copolymers.

It is known that mouldings obtained from olefin polymers can readily become electrostatically charged, with the result that they attract dust particles, which adversely affect both the appearance and the quality of the mouldings. With mouldings of large surface area, excessive charging and contact can actually be accompanied by charge equalisation through spark discharge. For this reason, there has been many attempts to find agents which reduce or prevent the undesirable electrostatic charging of mouldings.

Several organic compounds have already been proposed as antistatic agents for polyolefins. One feature common to compounds of this kind is, for example, the presence of at least one hydrophobic and one hydrophilic radical in the same molecule. In most instances, the hydrophobic radicals are long-chain alkyl groups. whilst the hydrophilic radicals can be, for example, hydroxy groups, polyether groups or salt groups (cf. German Auslegeschrifts Nos. 1,248,932, 1,247,010 and 1,247,009).

One major disadvantage of treating plastics such as these, for example polyethylene, with antistatic agents, is that the antistatic agents which are used show inadequate thermal stability and poor stability to light, with the result that the mouldings streated with them discolour very easily, in some instances very seriously. In addition, the surface quality of finished products is often adversely affected by exudation, or the excessive hygroscopicity of the additives, or even by the secretion of water. These phenomena are a serious disadvantage especially in the production of films, and make it impossible to use antistatic agents which are otherwise suitable in principle. In addition, additives such as these frequently lose their effectiveness during incorporation into the particular thermoplasts. In some instances, this is attributable to the fact that they undergo complete or partial decomposition at the occasionally very high temperatures at which the plastics are processed.

In addition, the hitherto-used substances, and their decomposition products, are often physiologically unacceptable which again is of considerable importance, particularly in the case of films, for example when they are used for packaging foodstuffs.

Accordingly, to improve the inadequate light and thermal stability of the antistatic agents, it has been proposed to incorporate stabilisers, such as organic phosphites or alkyl sulphonates etc., together with the antistatic agents, into the plastics.

The objects of the present invention was to provide antistatic agents for polyolefin compositions which are stable both to heat and light and which do not necessitate any further additions of stabilisers. In addition, the anti-electrostatic agents should be physiologically acceptable.

According to the invention, this object is achieved by using salts of fatty acids with 1,3-diols containing a dialkylamino group attached through a methylene group in the 2-position, as anti-electrostatic agents.

Accordingly, the invention relates to an anti-electrostatic light-stable moulding composition based on an olefin polymer, and optionally containing fillers, plasticisers, pigments, lubricants and soluble dyes, which contain, as antistatic agent a salt having the Formula I

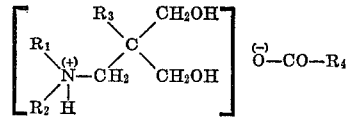

in which
$R_1 = CH_3$ or $C_2H_5$, preferably $CH_3$,
$R_2 = C_1$–$C_{18}$ alkyl or
$R_1 + R_2 = C_4$–$C_6$ alkylene,
$R_3 = C_1$–$C_6$ alkyl, and
$R_4 = C_5$–$C_{22}$ alkyl or alkenyl In the above formula, $R_1$ and $R_2$ preferably represent $CH_3$, $R_3$ represents $CH_3$ or $C_2H_5$; and $R_4$ represents $C_{10}$–$C_{18}$ alkyl or $C_{17}$-alkenyl (oleyl).

A compound in which $R_1$ and $R_2 = CH_3$; $R_3 = C_2H_5$ and $R_4 = C_{11}$-alkyl (undecyl), has proved to be the most effective salt of the above formula.

The antistatically-active salt is added to the moulding composition preferably in a quantity of from 0.03 to 2% by weight, and especially in a quantity of from 0.05 to 1% by weight, based on the olefin polymer. It is of course also possible to use mixtures of the aforementioned salts.

In the context of this application polymers include homopolymers of olefins, copolymers of at least one olefin and at least one other copolymerisable monomer with a proportion of at least 50% by weight of an olefin, as well as mixtures of the aforementioned homopolymers and copolymers.

The following are mentioned by way of example: polyethylene, polypropylene, polybutene, poly-4-methyl-1-pentene, ethylene-propylene copolymers, ethylene-butene copolymers, ethylene-hexene copolymers, ethylene-vinyl acetate copolymers, ethylene-vinyl chloride copolymers, polyolefin ionomers, and polyallomers etc.

Polyethylene and polypropylene are preferred, polyethylene being particularly preferred.

The new antistatic agents can be prepared simply by combining tert.-aminodiols (cf. British patent application 61/298,168) corresponding to the general formula

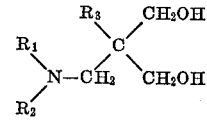

and fatty acids of the general formula $R_4$—COOH, in which $R_1$–$R_4$ have the meanings given above, preferably at temperatures above the melting point of the carboxylic acids used or even at temperatures of from 10 to 40° C., providing the salts formed are liquid at temperatures in this range. For example, the solid carboxylic acid may simply be dissolved in the liquid aminodiol at room temperature. Saturated carboxylic acids whose hydrocarbon radical contains 10 to 18 carbon atoms, are particularly preferred. The salts formed are, in some instances relatively mobile, colourless oils which can readily be added, applied to or introduced into the olefin polymers and processed. Whereas most salts remain mobile even after prolonged storage, the stearates solidify to form crystalline waxes. Even in the event of prolonged storage in light, there are no signs of yellowing, in contrast to what is observed with corresponding salts of hydroxy ethylated amines.

The physiological acceptability of the anti-electrostatic agents used in accordance with the invention also deserves emphasis.

The antistatic agents used in accordance with the invention may optionally be worked into the polyolefins simultaneously with the incorporation of the conventional additives, such as pigments, soluble dyes, plasticisers, and lubricants, does not present any difficulties, nor does it necessitate the use of solvents of suspending agents. It can be carried out by direct addition during preparation of a granulate, or during moulding in conventional processing apparatus.

The products do not show any signs of decomposition or discolouration, even at relatively high or excessively high processing temperatures, for example in the range from 240 to 260° C., or during prolonged residence periods in the processing apparatus; more particularly no water is given off as is possible through amidation reactions if secondary and primary amines are used.

It is of course also possible simply to mix the components, i.e. tert.-aminodiol and fatty acid, into the polyolefin and thus to prepare the effective salt in situ.

It is also possible initially to prepare a concentrate of the antistatic agent in relatively little polyolefin (masterbatch) and then to add this concentrate to more polyolefin.

Although the advantage of the anti-electrostatic agents used in accordance with the invention lies in the very fact that there is no need to add stabilisers, the conventional stabilisers may optionally be used in order to prevent yellowing.

Although not absolutely necessary, it is possible to dissolve or finely disperse (suspend) the antistatic agents in a suitable readily volatile organic solvent, such as a lower alcohol, for example methanol or ethanol, to add the solution or suspension thus obtained to the polyolefin, and then to remove the solvent by distillation. The finished plastics mouldings based on the polyolefins can also be surface-treated by dipping or spraying with a dilute aqueous or organic solution of the anti-electrostatic agents.

The mouldings according to the invention can be injection-moulded to form mouldings of any type by known methods, such as blow-moulding, rolling or pressing etc. The mouldings do not show any signs of yellowing, either under the influence of light or of that of heat, and show outstanding anti-electrostatic properties. The anti-electrostatic agents did not show any tendency towards exudation, which is of particular advantage in the production of films. In addition, the anti-electrostatic agents used in accordance with the invention are largely acceptable from the physiological point of view.

EXAMPLES

General procedure

High pressure polyethylene of the kind specified in the explanations to Table I, was delivered in the form of a granulate onto a two-roll laboratory mixing apparatus at a temperature of 150° C. and under a friction of 1.2, and drawn into a coherent rolled sheet. The products identified below were then gradually added to the polyethylene in the percentages quoted in the table, and homogeneously incorporated over a period of 10 minutes.

The following salts were used:

(1) 2-dimethylaminomethyl-2-ethyl,-1,3-propane diol+3-pentanecarboxylic acid
(2) 2-dimethylaminomethyl-2-ethyl-1,3-propane diol+3-heptanecarboxylic acid
(3) 2-dimethylaminomethyl-2-ethyl-1,3-propane diol+undecylenic acid
(4) 2-dimethylaminomethyl-2-ethyl-1,3-propane diol+dodecanoic acid
(5) 2-dimethylaminomethyl-2-ethyl-1,3-propane diol+tetradecanoic acid
(6) 2-dimethylaminomethyl-2-ethyl-1,3-propane diol+hexadecanoic acid
(7) 2-dimethylaminomethyl-2-ethyl-3-propane diol+stearic acid
(8) 2-dimethylaminomethyl-2-ethyl-1,3-propane diol+oleic acid
(9) 2-dimethylaminomethyl-2-ethyl-1,3-propane diol+stearic acid To produce test specimens, the rolled sheets obtained were granulated and moulded into panels measuring 120 x 120 x 4 mm. (low-pressure heating time 5 minutes, high-pressure moulding time 5 minutes, cooling time 10 minutes).

TABLE I

| Example | Polyethylene | Salt | Percent by weight | Surface resistance (1) [ohms] | Limiting charge (2) V/cm. | Half-life (3) [sec.] | Charging characteristic (4) |
|---|---|---|---|---|---|---|---|
| 0 (comparison) | I or II | | | $10^{14}$–$10^{16}$ | 1,200–4,000 | 3,600 | 8–10 |
| 1 | I | 1 | 2 | $4.30^{13}$ | | | 1 |
| 2 | I | 2 | 2 | $1.10^{14}$ | | | 1 |
| 3 | I | 3 | 2 | $9.0^{11}$ | | | 1 |
| 4 | II | 4 | 0.2 | $3.10^{10}$ | | | 1 (5) |
| 5 | II | 5 | 0.2 | $3.30^{11}$ | | | 1 (6) |
| 6 | II | 6 | 0.2 | $3.10^{11}$ | | | 1 (7) |
| 7 | I | 7 | 2 | $3.10^{9}$ | −10 | 5 | 2 |
| 8 | I | 8 | 2 | $2.10^{9}$ | −380 | 30 | 4 |
| 9 | I | 9 | 2 | $2.10^{9}$ | −50 | 95 | 4 |

In order to demonstrate the technical advance obtained in terms of processibility and stability to light, the salts were assessed immediately after preparation and after storage for 6 months in light:

| Product | Colour | Aggregate condition | Changes after 6 months in regard to colour and aggregate condition |
|---|---|---|---|
| 1 | Traces of yellow | Liquid | Unchanged. |
| 2 | Pale yellow | Thinly liquid | Do. |
| 3 | do | do | Do. |
| 4 | Traces of yellow | do | Do. |
| 5 | do | Liquid | Colour unchanged, crystalline. |
| 6 | Pale yellow | Wax-like | Unchanged. |
| 7 | do | do | Do. |
| 8 | Orange-yellow | Thinly liquid | Do. |
| 9 | Traces of yellow | Wax-like | Do. |

The following salts were prepared for comparison purposes:

(10) N-methyldiethanolamine+stearic acid
(11) N-butyldiethanolamine+stearic acid
(12) N-methyl-diisopropanolamine+stearic acid The three products accumulated in the form of a yellow, semi-crystalline greasy mass. Some had undergone a change in colour to reddish-brown after 6 months at average temperatures of around 20° C. The discoloured zone had become viscous. The products are extremely difficult to work into polyethylene, and lead to discolouration.

Examplantions to Table I

I: High-pressure polyethylene, $d=0.922$, melt index 2.75 g./10 minutes according to ASTM D 1238 and DIN 53 735 draft II: High-pressure polyethylene, $d=0.918$, melt index=1.5 g./10 minutes according to ASTM D 1238 and DIN 53735 draft (1) Measuring the surface resistance according to DIN 53 482 and VDE 0303/part 3 with a circular electrode arrangement C (according to IEC).
(2) Maximum field intensity obtainable by a specific friction process. Measurement according to "Kunststoffe" 1966, No. 1, pages 51–55.
(3) The period in which the charge falls from the limit charge to half the limiting charge. Measurement according to "Kunststoffe" 1966, No. 1, pages 51–55.
(4) Charging characteristic=$1n$ (limiting charge×half-life) reference Nos.:
   8–10: high tendency towards charging (dust attracted)
   5–7: reduced tendency towards charging (no dust attracted)
   4–0: antistatic behaviour
(5) Impact strength according to DIN 53 448:
   longitudinally 1780 kp./cm./cm.$^2$
   transverse 2670 kp./cm./cm.$^2$
(6) Impact strength according to DIN 53 448:
   longitudinal 1600 kp./cm./cm.$^2$
   transverse 2640 kp./cm./cm.$^2$
(7) Impact strength according to DIN 53 44":
   longitudinal 1700 kp./cm./cm.$^2$
   transverse 3130 kp./cm./cm.$^2$

What is claimed is:

1. A moulding composition which comprises an olefin polymer and an antistatic effective amount of a compound of the formula

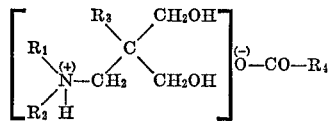

wherein $R_1$ is $CH_3$ or $C_2H_5$, $R_2$ is alkyl having from 1 to 18 carbon atoms or $R_1$ and $R_2$ when taken together are alkylene having from 4 to 6 carbon atoms, $R_3$ is alkyl having from 1 to 6 carbon atoms and $R_4$ is alkyl or alkenyl containing from 5 to 22 carbon atoms.

2. The moulding composition of claim 1 wherein the antistatic agent is a compound of said formula wherein $R_1$ and $R_2$ are methyl, $R_3$ is methyl or ethyl, and $R_4$ is oleyl or alkyl having from 10 to 18 carbon atoms.

3. The moulding composition of claim 1 wherein the antistatic agent is the dodecanoic acid salt of 2-dimethylaminomethyl-2-ethyl-1,3-propane diol.

4. The moulding composition of claim 1 wherein the amount of said antistatic agent, based on the weight of said olefin polymer, is from 0.03 to 2% by weight.

5. The moulding composition of claim 1 wherein the olefin polymer is polyethylene or polypropylene.

References Cited

UNITED STATES PATENTS 3,441,553  4/1969  Rombusch et al. ____ 260—94.9

JAMES A. SEIDLECK, Primary Examiner

E. J. SMITH, Assistant Examiner

U.S. Cl. X.R.

260—87.3, 87.5 C, 88.2 S, 94.9 GB, Digest 20